United States Patent [19]

Osa et al.

[11] 4,403,022

[45] Sep. 6, 1983

[54] CHEMICALLY MODIFIED PHOTOELECTROCHEMICAL CELL

[75] Inventors: Tetsuo Osa; Masamichi Fujihira, both of Sendai, Japan

[73] Assignee: The President of Tohoku University, Miyagi, Japan

[21] Appl. No.: 221,977

[22] Filed: Jan. 2, 1981

[51] Int. Cl.³ .............................................. H01M 6/36
[52] U.S. Cl. ..................................................... 429/111
[58] Field of Search ......................................... 429/111

[56] References Cited

U.S. PATENT DOCUMENTS 4,086,398  4/1978  Cartmell et al. ...................... 429/111
4,255,501  3/1981  Osa et al. ............................. 429/111

FOREIGN PATENT DOCUMENTS 55-124964  9/1980  Japan .................................... 429/111

OTHER PUBLICATIONS

T. Osa et al., "Photocell Using Covalently-Bound Dyes on Semiconductor Surfaces," *Nature*, vol. 264, pp. 349–350 (1976).

*Primary Examiner*—Aaron Weisstuch
*Attorney, Agent, or Firm*—Robert E. Burns; Emmanuel J. Lobato; Bruce L. Adams

[57] ABSTRACT

A chemically modified photoelectrochemical cell including at least one cathode and a plurality of anodes, at least said plurality of anodes being constituted with a semiconductor, each of said plurality of anodes being formed by fixing through covalent bonds molecules of at least one sensitizer dye on the surface of a light-transmissible flat plate of an n-type semiconductor or a light-transmissible flat plate covered with a thin film of an n-type semiconductor, and said plurality of anodes being disposed parallelly to each other and in the form of layers in an electrolyte solution, together with said at least one cathode. Thus, since this photoelectrochemical cell can convert photoenergy of a longer wavelength to electric energy with a high efficiency by making the use of the dye sensitization effect, sufficient practical utility to the photodevices is obtained.

4 Claims, 7 Drawing Figures

CHEMICALLY MODIFIED PHOTOELECTROCHEMICAL CELL

FIELD OF THE INVENTION

This invention relates to a photoelectrochemical cell, more particularly, to a chemically-modified photoelectrochemical cell having electrodes each formed by bonding one or more sensitizer dyes on the surface of a phototransmitting semiconductor by virtue of covalent bonds.

Since a photoelement has the function of converting photoenergy to electric energy, its potential applications are countless, for example, it may be useful in one aspect as a photosensitive element in various optical measurement instruments and, in a more advanced aspect, it may serve as means for converting solar energy to electric energy.

BACKGROUND OF THE INVENTION

Among conventionally known photodevices, there are, as solid state photoelements, so-called solar batteries each of which can be obtained by forming a p-n junction near the surface of a crystal principally made of a silicon semiconductor. However, semiconductive crystals of high purity are indispensable as starting materials for such solar batteries. Corollary to this, the manufacturing cost of a solar battery is high and its use is thus limited to special applications only. Accordingly, such solar batteries are not considered to be as commonly usable energy conversion elements.

With a view toward solving the above-described drawback of conventional solar batteries, various studies have recently been carried out on photoelectrochemical cells which make use of inexpensive semiconductors such as sintered semiconductors and still function sufficiently.

However, such photoelectrochemical cells are accompanied by the problem that their anodes would be dissolved due to the photoelectrode reaction regardless of the type of semiconductive material to be used, thereby resulting in a shortened lifetime of the anodes. Of course, there are some exceptional semiconductive electrodes which do not practically involve such a dissolution problem, e.g., tin oxide, titanium dioxide, strontium titanate, etc. However, all of these semiconductors exhibit sensitivity only to radiation in the ultraviolet region. Thus, they are unsuitable as conversion elements for solar energy whose spectrum is distributed widely in the visible and near-infrared radiation regions and have thus not been adapted for the conversion of solar energy to electric energy.

In view of the above-described drawbacks of the prior art electrodes, many attempts have been made to expand to a longer wavelength side the sensible wavelength region of a stable semiconductor which is sensitive to ultraviolet light but does not develop the dissolution problem due to the photoelectrode reaction. Such attempts were all dependent on dye sensitization, in other words, it was tried in each of the attempts to convert photoenergy of longer wavelengths, which cannot be absorbed by a semiconductor electrode per se, to electric energy by adding to an electrolyte solution a dye which is capable of absorbing radiation of longer wavelengths than the characteristic absorption wavelengths of the semiconductor electrode.

It has been made clear through a measurement of a photo electromotive force using monochromatic light that, in a photoelectrochemical cell whose electrolyte solution contains a sensitizer dye, photoenergy having a wavelength longer than the characteristic absorption wavelength of its semiconductor per se can be converted in part to electric energy. However, its energy conversion efficiency is extremely low and, consequently, it has been concluded that such photoelectrochemical cells are not suited for practical applications.

By the way, as a cause of the low conversion efficiency described above, it has been known that the dye dissolved in an electrolyte solution does not take any part in the dye sensitization effect but only the dye which is absorbed on the electrode surface contributes to the dye sensitization effect. However, no means have been proposed to solve the above-described principal problem of a low conversion efficiency.

In view of the above drawbacks of the prior art photoelectrochemical cells, an object of this invention is to provide a chemically-modified photoelectrochemical cell which can convert photoenergy of a longer wavelength to electric energy with a high efficiency by making the use of the dye sensitization effect, thereby adding sufficient practical usability to the photodevices.

SUMMARY OF THE INVENTION

In a chemically-modified photoelectrochemical cell according to this invention, wherein either the anode or the cathode, or both of them are made of a semiconductor, the improvement wherein at least the anodes are constructed by a plurality of semiconductor electrode plates whose surfaces are chemically modified with a sensitizer dye or dyes by bonding through covalent bonds the molecules of said dye or dyes onto the surface of a light-transmitting n-type semiconductor plate or a plate coated with a thin film of an n-type semiconductor, and these electrode plates are disposed parallelly to each other and in layers in the electrolyte solution together with the cathode or cathodes. Light is irradiated onto the thus-constructed electrode plate unit and converted to electric energy.

A dye-sensitized wet battery consisting of a single plate of a light transmitting electrode chemically modified with only a single kind of dye has been reported by the inventors of this invention (see "Nature", November 1976 issue, Volume 264, No. 5584, PP 349–350). The above wet battery, however, exhibited an extremely low conversion efficiency of photoenergy to electric energy in the order of 0.1% at most and thus was unsuitable for practical applications. According to the present invention, this photoelectrochemical cell has been improved so as to have the above-described structure, thereby bringing about an improvement in its applicability.

In a chemically modified photoelectrochemical cell of this invention, there is no absorption of light by dye present in the electrolyte solution. Accordingly, there is no need to add dye in the course of its use. Light is absorbed only by dye molecules which are bound to the surface of an electrode through covalent bonds and thus converted to electric energy efficiently.

BRIEF DESCRIPTION OF THE DRAWINGS

Preferred embodiments of this invention will be described below in reference to the appended drawings, in which.

DESCRIPTION OF THE PREFERRED EMBODIMENTS

Figure 1A:
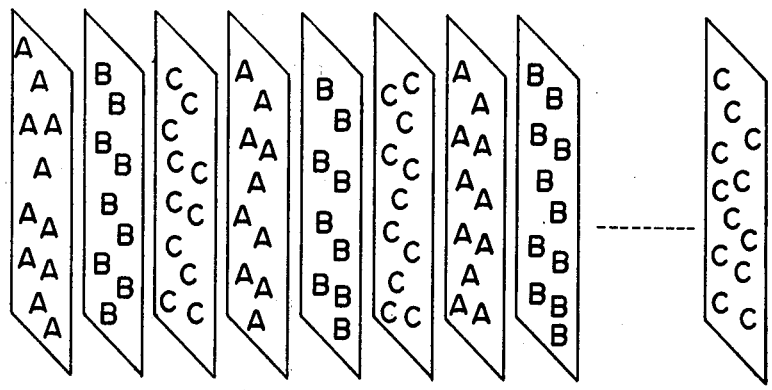
FIGS. 1a, 1b and 1c show respectively types (1a, 1b and 1c) of distribution of sensitizer dye molecules on chemically modified electrode plates which constitute anodes in a chemically modified photoelectrochemical cell according to this invention.
Figure 1B:
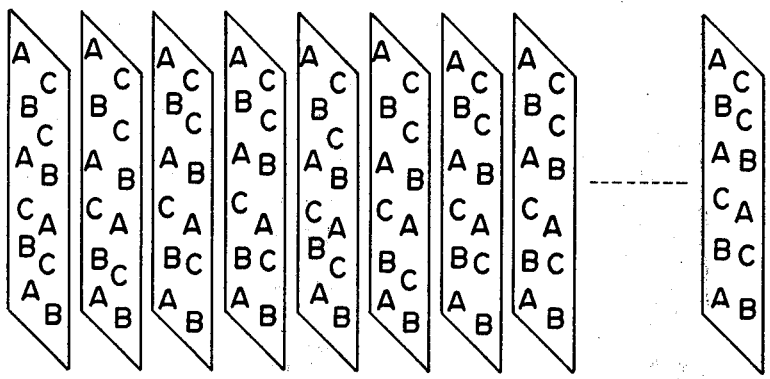
Figure 1C:
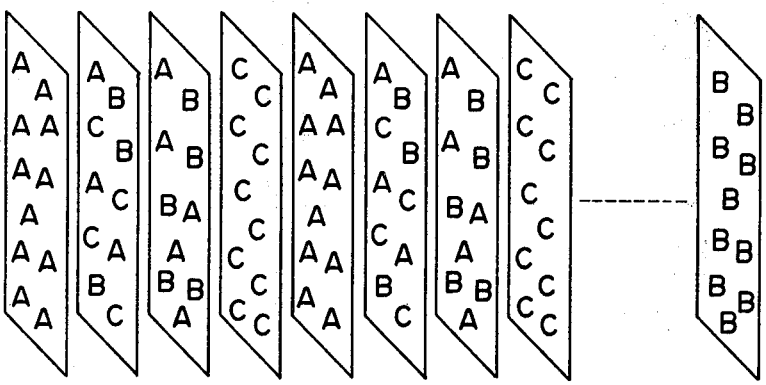

Chemically modified photoelectrochemical cells according to this invention may be classified roughly into the following three types with respect to their anodes, as shown in FIGS. 1a, 1b and 1c:

(1) Type 1a—Three kinds of plates are employed in a repeating series each kind of plate being chemically modified with a single kind of dye.

(2) Type 1b—Each plate is chemically modified by more than one kind of dye and a plurality of such plates are combined; and (3) Type 1c—Three kinds of plates chemically modified respectively with one of three kinds of dyes and a further plurality of plates chemically modified with more than one kind of dye are suitably combined.

As semiconductors usable in the present invention, there may be an n-type semiconductor for each anode and a p-type semiconductor for each cathode. It is preferable to use, as each electrode, a stable compound free from the above-described problem of dissolution by photoelectrode reaction when irradiated by light. As n-type semiconductors, there are, for example, oxides such as tin oxide, titanium dioxide, and strontium titanate. On the other hand, as p-type semiconductors, there may be employed, for example, gallium arsenide, gallium phosphide, silicon carbide, copper oxide, etc.

It is of course possible to make electrodes only with one of the above-described semiconductors. While such electrodes have the advantage of a low electrical resistance, they may not be considered to be suitable as they develop light loss due to scattering or the like, they have a low mechanical strength and they are expensive from an economic standpoint. As an advantageous electrode free of the above-described drawbacks, there are electrodes transparent to the wavelengths in the range of light to be utilized, for example, so-called coated electrodes which are each formed by applying a thin film of either one of the above-described semiconductors to the surface of a plate made of a material such as glass, quartz, or the like, for instance, NESA (trade mark) glass. Such a coated electrode preferably has an overall thickness of the order of 1 mm. The thickness of the semiconductor film may range from 500 to some thousands of Angstroms, but preferably is about 1000 Angstroms or so.

Any dye may be used as a sensitizer dye as long as it exhibits a sensitizing action. Examples of employable dyes include xanthene dyes such as rhodamine B, rose bengal, eosin, and erythrosin; cyanine dyes such as quinocyanine and cryprocyanine; basic dyes like phenosafranine, capri blue, thiosine and methylene blue; porphyrin compounds such as chlorophyl, zinc porphyrin, and magnesium porphyrin; azo dyes; antraquinone dyes; and others.

Such sensitizer dyes must, in the present invention, be bonded (or chemically modified) to the surface of the above-described electrode plate by virtue of covalent bonds. Among the sensitizer dyes described above, there are some dyes which cannot perform the above-described chemical modification as they normally exist, including quinocyanine, cryptocyanine, metal porphyrins, etc. However, these sensitizer dyes may be rendered suitable for chemical modification of semiconductor electrodes by converting them to their derivatives containing one or more amino, carboxyl or hydroxyl groups.

An electrolyte solution for a chemically modified photoelectrochemical cell according to this invention is required to contain an electrolyte substance providing ionic conductivity to the solution, for example, $Na_2SO_4$, NaCl or the like and a reversible oxidation-reduction system for carrying electrons through the solution, for instance, a quinone-hydroquinone pair.

As a solvent for such an electrolyte solution, there are for example water, DMF, acetonitrile, or the like but water is preferred.

The concentration of the electrolyte substance is preferably in the range of from 1 to 0.1 $mol/dm^3$ while a range of $10^{-4}$ to $10^{-1}$ $mol/dm^3$ is preferable as the concentration of the above-described oxidation-reduction system.

The above-described oxidation-reduction system may, however, not always be required where water is used as a solvent of the electrolyte solution, and said water serves as a reducing agent to generate oxygen at each anode and hydrogen is generated at each cathode as a result of protons ($H^+$ ions) being combined with electrons there. In this instance, besides a conversion of photoenergy to electric energy, conversion to chemical energy also takes place in the form of the generation of hydrogen and oxygen.

For bonding molecules of a sensitizer dye onto the surface of an electrode plate by virtue of covalent bonds (in other words, for chemically modifying the surface of the electrode plate with the sensitizer dye through covalent bonds), several different methods may be adopted, including those illustrated below as examples.

Since the above-described semiconductors adopted as electrode materials in the present invention are generally metal oxides, the surface of an electrode plate contains hydroxyl groups. A chemical modification of such hydroxyl groups by one of the above-described sensitizer dyes can be carried out by using a compound containing a functional group capable of coupling with said sensitizer dye (hereinafter, expressed as "D"), for example, a silylating agent such as γ-aminopropyl triethoxysilane or cyanuryl chloride. Examples of such a chemical modification will be described below:

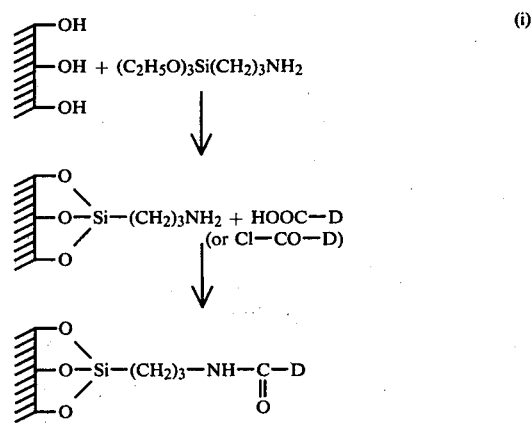

(i)

-continued

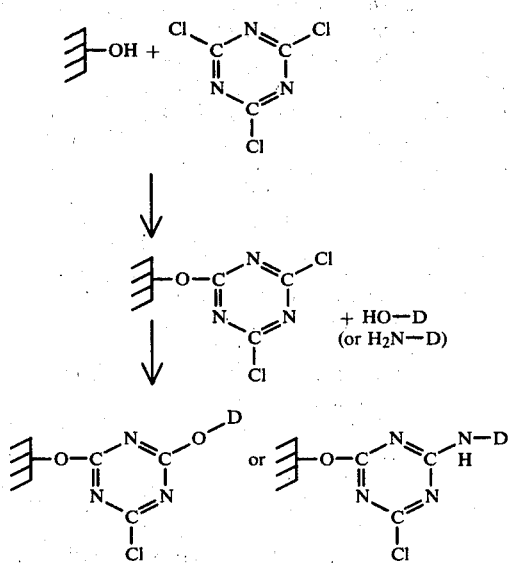
(ii)

In the above method (i), γ-aminopropyl triethoxysilane as a compound (intermediate compound) having a functional group first reacts with hydroxyl groups of the semiconductor on the surface of an electrode plate to form an intermediate, to which is bound a carboxylic acid or acid chloride derivative of a sensitizer dye (D) to form amide bonds, thereby chemically modifying the surface.

According to the above method (ii), cyanuryl chloride is employed as an intermediate compound and an alcohol or amine derivative of a dye sensitizer D is used to complete the chemical modification.

Each of the above methods (i) and (ii) performs a chemical modification of the surface of an electrode plate with a sensitizer dye through an intermediate compound. Without use of such an intermediate compound, it is also possible to produce a direct chemical modification of a semiconductor on the surface of an electrode plate by a sensitizer dye. An example of such a direct chemical modification is expressed in terms of chemical equations as follows:

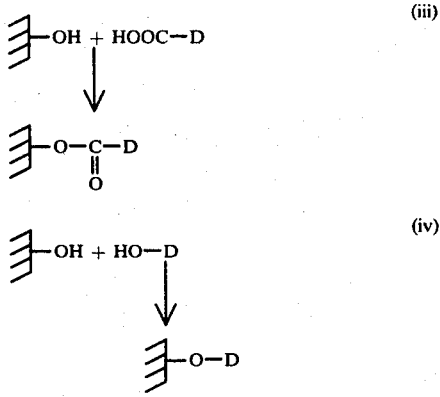
(iii)

(iv)

In each of these methods (iii) and (iv), the semiconductor on the surface of an electrode plate is chemically modified by carrying out a dehydrative condensation reaction between a carboxylic acid or alcohol derivative of a sensitizer dye D and the hydroxyl groups of the semiconductor to form ester or ether bonds therebetween.

In an electrode modified with a sensitizer dye in accordance with either of the above method (iii) and (iv), the sensitizer dye D is located extremely close to the surface of a semiconductor and, moreover, the concentration of the sensitizer dye per unit area is high. Accordingly, the dye sensitization provides a large quantum yield and an extremely effective energy conversion can thus be carried out. Furthermore, since the above methods (iii) and (iv) use merely a surface chemical coupling reaction which does not require any intermediate compound, modification of an electrode by a sensitizer dye can be conducted economically. Consequently, the above methods (iii) and (iv) can be considered to be most suitable for chemically modifying the surface of the above-described semiconductor electrode with a sensitizer dye in accordance with this invention.

Besides the above methods (i) through (iv), there is a method (v) in which the hydroxyl groups of a semiconductor on the surface of an electrode plate is first treated with thionyl chloride to convert the semiconductor into a chloride, and thereafter a Grignard's reagent or a lithium compound of a sensitizer dye D is reacted with the chloride to substitute molecules of said sensitizer dye D for the chlorine atoms, thereby modifying the surface of the electrode surface with the sensitizer dye (D). This method (v) may be expressed by the following chemical equations:

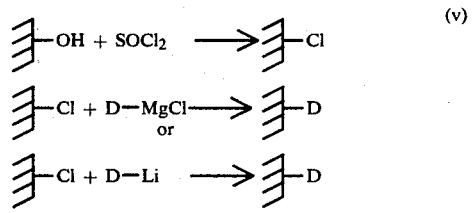
(v)

Electrodes chemically modified with a sensitizer dye in accordance with any one of the above methods (i) through (v) may be classified into either one of the three types (1a, 1b and 1c) shown in FIGS. 1a, 1b and 1c respectively.

Figure 2A:
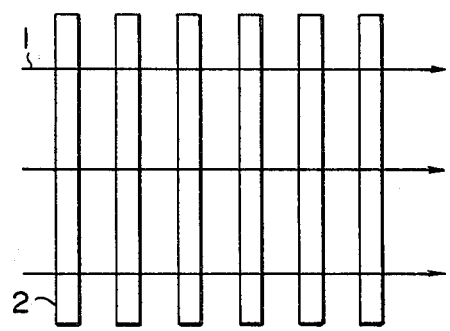
FIGS. 2a, 2b and 2c illustrate respectively arrangement examples (2a, 2b and 2c) of said electrode plates.
Figure 2B:
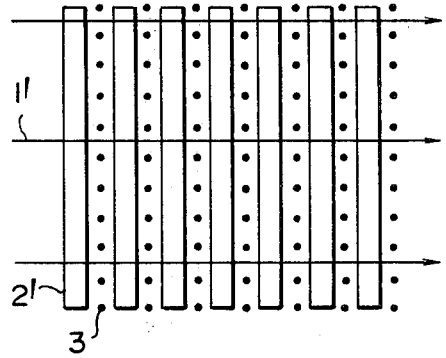
Figure 2C:
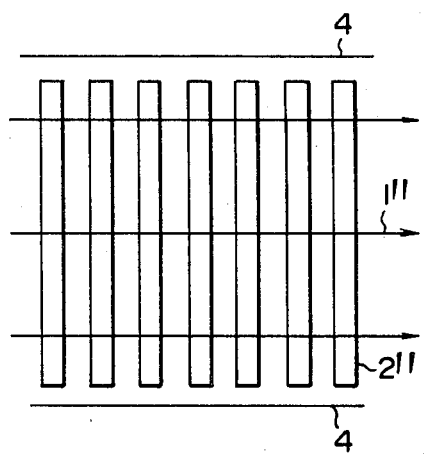

FIGS. 2a, 2b and 2c show examples of an arrangement of electrode plates chemically modified with the above sensitizer dye in a chemically modified photoelectrochemical cell according to this invention. FIG. 2a illustrates an arrangement in which anode and cathode plates 2, 2, ... are disposed parallelly to each other. In FIG. 2b, electrode plates 2', 2', ... are used as anodes and cathodes are formed by mesh-like plates 3, 3, ... made of a metal or carbon material and capable of transmitting light therethrough. On the other hand, in FIG. 2c, electrode plates 2", 2", ... are arranged as anodes while members 4, 4, which are made of a semiconductor, metal, or carbon material, are used as cathodes. In FIGS. 2a to 2c, numerals 1, 1' and 1" indicate the direction of light. Although the distance between each two electrodes may not be specifically limited, it can be determined in view of the internal resistance. The number of electrode plates to be arranged varies depending on the capacity of each photoelectrochemical cell, but 10 to 50 electrode plates, preferably about 30 electrode plates, may be employed in a general cell.

Figure 3:
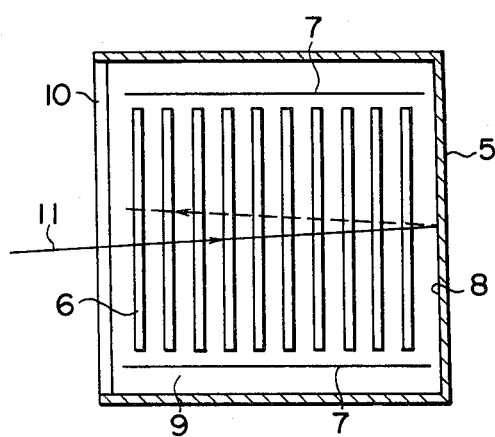
FIG. 3 shows an example of the structure of said photoelectrochemical cell.

FIG. 3 shows an example of a structure of a dye-sensitized, photoelectrochemical cell according to this invention. In the drawing, numeral 5 indicates a container (normally made of plastics). Anode plates, as semiconductors modified chemically with sensitizer dyes, are shown at numeral 6 and numeral 7 indicates cathodes. A reflector mirror (for example, made of a thin metal film) is indicated at numeral 8, while numerals 9 and 10 show an electrolyte solution and condensing lens, respectively. In the photocell, light 11 generates into the interior of the photocell through the condensing lens 10 and is transmitted through the anode plates 6, 6, 6 . . . , during which it is absorbed by the sensitizer dyes bound on the surfaces of said anodes and converted to electric energy. However, the photoenergy of the light is generally absorbed completely in the course of said transmission through the anodes. Electric energy may be obtained from said photocell from the anodes 6, 6, . . . and cathodes 7, 7 through suitable output means.

Now, an example of the manufacture of a dye-sensitized photoelectrochemical cell according to this invention will be described.

A substrate made of Pyrex (trade mark) and coated with tin oxide is immersed in 1 l of a methylene chloride solution containing 5 g of rhodamine B and 5 g of dicyclohexylcarbodiimide and left at room temperature for 24 hours to bond the molecules of rhodamine B to the surface of the tin oxide electrode by ester bonds, in other words, to chemically modify said surface with rhodamine B. Thereafter, the Pyrex plate is taken out of the solution and any unreacted substances are washed away with methylene chloride. Ten electrode plates (i.e., 20 electrode surfaces) chemically modified with tin oxide in the same manner as described above are arranged, as shown in FIG. 3, parallelly in the form of layers in a 0.2 M aqueous $Na_2SO_4$ solution (electrolyte solution) containing $1 \times 10^{-2}$ M of hydroquinone and quinone (1:1). Light is irradiated through the condensing lens in a direction perpendicular to the electrode plates. The light is reflected by the reflection mirror 8. It has been ascertained that light passes through 40 electrode-solution interfaces in total. Each of the cathodes 7 is formed by an electrode plate made of platinum. The apparent quantum efficiency of spectral sensitization by a monochromatic light reaches about 15% at 570 nm, which is the absorption peak of rhodamine B.

What is claimed is:

1. A chemically modified wet-type photoelectrochemical cell comprising a light-admitting container, a plurality of anodes and at least one cathode in an electrolyte solution in said container, said anodes comprising light-transmitting flat substrates of n-type semiconductor chemically modified by having fixed thereon through covalent bonds molecules of a plurality of different kinds of sensitizer dyes having different absorption wavelengths, said anodes being disposed parallel to each other in the form of layers in said electrolyte solution.

2. A photoelectrochemical cell according to claim 1, wherein different ones of said anodes are chemically modified with different kinds of sensitizer dyes respectively.

3. A photoelectrochemical cell according to claim 1, wherein each of said anodes is chemically modified by more than one kind of sensitizer dye.

4. A photochemical cell according to claim 1, wherein some of said anodes are each chemically modified by more than one kind of sensitizer dye and other of said anodes are each modified by a single kind of sensitizer dye respectively.

* * * * *